United States Patent
Rothschild

(10) Patent No.: US 8,437,797 B2
(45) Date of Patent: *May 7, 2013

(54) WIRELESS IMAGE DISTRIBUTION SYSTEM AND METHOD

(75) Inventor: Leigh M. Rothschild, Sunny Isles Beach, FL (US)

(73) Assignee: SRR Patent Holdings, LLC, Cheyenne, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,140

(22) Filed: May 14, 2012

(65) Prior Publication Data

US 2012/0224071 A1    Sep. 6, 2012

Related U.S. Application Data

(63) Continuation of application No. 12/228,256, filed on Aug. 8, 2008, now Pat. No. 8,204,437.

(51) Int. Cl.
*H04M 1/00* (2006.01)

(52) U.S. Cl.
USPC ............... 455/550.1; 455/556.1; 455/557; 455/404.2; 455/456.1; 455/457; 382/254; 382/255; 382/256; 382/257; 348/207.99; 348/207.1; 348/207.11; 348/116

(58) Field of Classification Search ........... 455/550.1, 455/556.1–557, 404.2, 456.1, 457; 382/254–275; 348/207.99, 207.1, 207.11, 116
See application file for complete search history.

(56) References Cited

U.S. PATENT DOCUMENTS

| | | | |
|---|---|---|---|
| 5,917,542 A | 6/1999 | Moghadam et al. | |
| 6,230,187 B1 | 5/2001 | Suzuki | |
| 6,253,023 B1 | 6/2001 | Fukushima et al. | |
| 6,642,959 B1 | 11/2003 | Arai | |
| 6,715,003 B1 | 3/2004 | Safai | |
| 6,832,275 B1 | 12/2004 | Aizawa | |
| 7,876,357 B2* | 1/2011 | Jung et al. | 348/207.1 |
| 8,204,437 B1* | 6/2012 | Rothschild | 455/41.2 |
| 2002/0051074 A1 | 5/2002 | Kawaoka et al. | |
| 2002/0057350 A1 | 5/2002 | Takei et al. | |
| 2002/0149677 A1* | 10/2002 | Wright | 348/207.1 |
| 2004/0169730 A1 | 9/2004 | Tamura et al. | |
| 2006/0171603 A1* | 8/2006 | Jung et al. | 382/254 |
| 2006/0174204 A1* | 8/2006 | Jung et al. | 715/751 |
| 2006/0174206 A1* | 8/2006 | Jung et al. | 715/751 |
| 2009/0027505 A1* | 1/2009 | Jung et al. | 348/207.1 |
| 2009/0115852 A1* | 5/2009 | Jung et al. | 348/207.1 |
| 2010/0271490 A1* | 10/2010 | Jung et al. | 348/207.1 |

* cited by examiner

Primary Examiner — Fayyaz Alam

(74) Attorney, Agent, or Firm — Cuenot, Forsythe & Kim, LLC

(57) ABSTRACT

A system and method for distributing at least one digital photographic image is presented, the system and method comprising at least one capturing device and at least one receiving device disposed in a communicative relation with one another via at least one wireless network. In particular, the capturing device is structured to capture the at least one digital photographic image via, for example, a capture assembly, whereas the receiving device is cooperatively structured to receive the digital photographic image via, for example, the at least one wireless network. In addition, the capturing device(s) and receiving device(s) may be disposed in a selectively paired relationship via one or more common pre-defined pairing criteria. Further, the at least one digital photographic image may be filtered via at least one pre-defined transfer criteria disposed on the capturing device and/or receiving device.

16 Claims, 8 Drawing Sheets

WIRELESS IMAGE DISTRIBUTION SYSTEM AND METHOD

CROSS-REFERENCE TO RELATED APPLICATIONS

This application is a Continuation of U.S. application Ser. No. 12/228,256, filed on Aug. 8, 2008, and incorporated herein in its entirety.

BACKGROUND OF THE INVENTION

1. Field of the Invention

The present invention is directed to a system and method for distributing one or more digital photographic images from at least one capturing device, such as, for example, a digital camera or other mechanism having digital photographic capabilities, and one or more receiving devices, wherein the receiving device(s) is cooperatively structured to automatically and/or selectively receive the digital photographic image(s) from the capturing device.

2. Description of the Related Art

Historically, photography, which includes the capturing of still and/or moving images, has been the source of interest and attention for many individuals, and is commonly employed for a variety of purposes, including, for business, pleasure, and as an art form. Particularly, scientists, artists, police enforcement, advertising agencies, and/or the general public use photography and/or capture still and moving images in a number of different circumstances and for various reasons. In particular, the capturing of photographic images may be used as a source of entertainment, to preserve memories, capture special moments, tell a story, or send a message.

In addition to a device structured for the primary purpose of capturing images, such as a camera, a number of other electronic devices, such as, for example, cellular telephones, personal digital assistants ("PDA"), etc., include mechanisms and/or various devices for capturing one or more still and/or moving digital photographic images. These various devices allow users to capture images in virtually any location, at virtually any time, and in virtually any situation, and thus the prevalence of photography in today's society continues to increase.

Oftentimes, groups of individuals appearing in a proximate location to one another find themselves capturing or attempting to capture digital photographic images of the same or similar object(s), scenery, people, etc. Moreover, these groups of individuals are often friends, family, and/or acquaintances that have the desire to share, distribute, and/or obtain copies of the digital photographic images captured by one another.

For exemplary purposes only, weddings, parties, vacations, sporting events, tours, etc., provide an ideal situation where a number of individuals such as, friends, family members, or acquaintances, may be simultaneously taking photographs, attempting to take photographs, or otherwise have the desire to obtain copies of photographs taken by other individuals. In such a situation, it is rather common for one or more of the photographers or individuals capturing the digital photographic image(s) to express his or her intent to share or otherwise distribute the image(s), for instance by e-mailing them directly to the other individuals and/or uploading the image(s) to an accessible location on the World Wide Web. For example, many web sites and/or companies, including, SHUTTERFLY®, KODAK® EASYSHARE®, and SONY® IMAGESTATION®, provide services for uploading and sharing photographs. While this may be one way to share the image, it is not ideal, as oftentimes, the images are in fact never sent, uploaded, or shared as initially intended. In addition, even in the event the digital photographic images are in fact uploaded to the web servers, it may take days, weeks, or even months to do so, and further, use of these third-party services may often lead to excessive, unnecessary frustration and aggravation.

As such, there is a current need in the art for an image distribution system and method which is structured to dispose one or more capturing devices in a communicative relation with one or more receiving devices for instantaneous, automatic, and/or selective distribution of images therebetween.

SUMMARY OF THE INVENTION

The present invention is directed to a system and method for distributing at least one digital photographic image from a capturing device, such as, for example, a digital camera or other mechanism having digital photographic capabilities, to one or more receiving devices, wherein the receiving device(s) is cooperatively structured to automatically and/or selectively receive the digital photographic image(s) from the capturing device.

In particular, the present invention comprises a capturing device and a receiving device disposed in a communicative relation with one another via, for example, a wireless network. In addition, the devices may be disposed in a selectively paired relation with one another via one or more common pre-defined pairing criteria. In such an embodiment, the devices automatically or selectively disposed in the communicative relation with one another upon disposition of the devices in a predetermined and/or proximate relation with one another, as will be discussed in greater detail below.

In addition, at least one embodiment of the present invention comprises filtering the at least one digital photographic image communicated to and/or received by the receiving device. For instance, the present invention may include one or more transfer criteria disposed on the capturing device and/or receiving device. As will become apparent from the following discussion, the transfer criteria may be structured to filter the image(s), for example, via object recognition, locational information, time, date, image name, etc.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
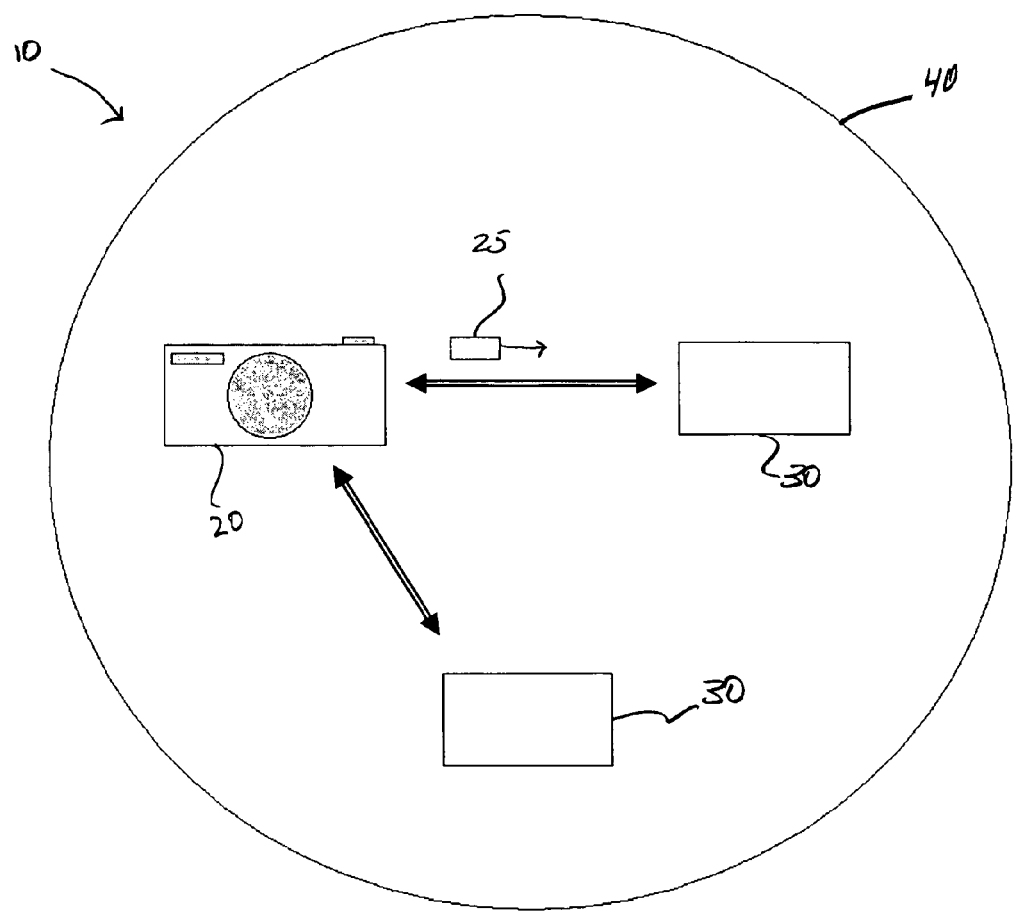
FIG. 1 is a schematic representation of at least one embodiment of the system disclosed in accordance with the present invention.

As illustrated in the accompanying drawings, and with primary reference to FIG. 1, the present invention is directed to a system, generally indicated as 10, cooperatively structured and disposed to distribute one or more digital photographic images. In particular, the system 10 of the present invention comprises at least one capturing device 20 and at least one receiving device 30 disposable in a communicative relation with one another, for example, via at least one wireless network 40 and/or via a wired connection. For instance, the wireless network(s) 40 of at least one embodiment may include short-range communication technology such as Bluetooth, infrared ("IR"), and/or other personal area networks ("PAN"), particularly wherein the capturing device(s) 20 and the receiving device(s) 30 are disposed proximate one another, for example, while located at or near the same landmark, in the same party, house, room, wedding, etc. However, the wireless network(s) 40 and/or communication protocol of the present invention need not be limited to short range technology, and may instead comprise a local area network ("LAN"), wide area network ("WAN"), satellite, WiFi, cellular, and/or the World Wide Web accessible via an Internet Protocol or other like protocols. Accordingly, in at least one embodiment of the present invention the capturing device(s) 20 and the receiving device(s) 30 may, but need not, be operatively located proximate one another to be disposed in the communicative relation.

Furthermore, the capturing device 20 of the various embodiments of the present invention generally comprises virtually any device structured to capture one or more digital photographic images 25, and/or otherwise equipped with the structures and mechanisms capable of facilitating the practice of the present invention in the intended manner, as discussed herein. In particular, the capturing device 20 may include a device structured for the primary purpose of capturing images, and thus may include, for example, a digital photographic camera, camcorder, video camera, etc. However, the capturing device 20 of the present invention may include, but is certainly not limited to, a cellular telephone, PDA, video game console, etc., having the structures and/or mechanism capable of capturing digital photographic images 25.

Moreover, the capturing device 20 of at least one embodiment further comprises a capture assembly 22 which is structured to selectively capture the digital photographic image(s) 25. The capture assembly 22 includes a lens assembly 23 comprising, for example, an objective, photographic, and/or optical lens, which may be removably and/or fixedly secured to a body 21 of the capturing device 20. In addition, the capture assembly 22 of at least one embodiment includes a trigger assembly 24, which, when activated, pushed, or manipulated is structured to facilitate the capturing of the digital photographic image(s) 25.

In addition, the capturing device 20 may include a display assembly (not illustrated) which is structured and disposed to display to a user thereof various data, images, etc. The display assembly may be virtually any size and may include virtually any display device, including but not limited to a liquid crystal display ("LCD").

Figure 2:
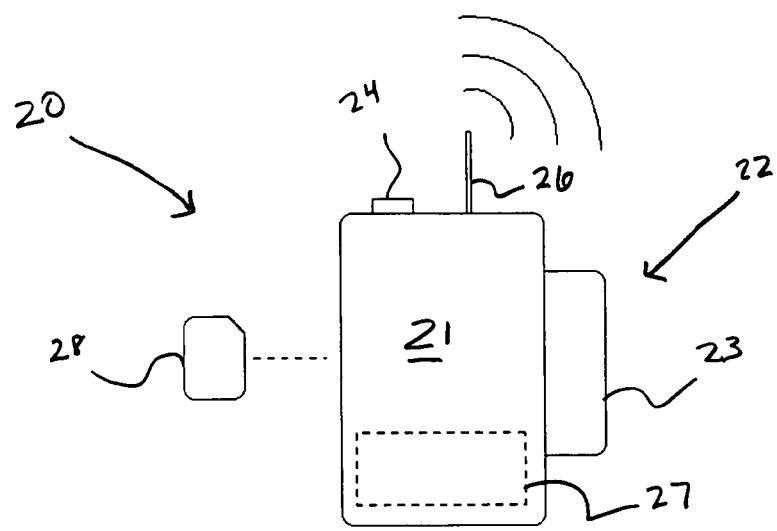
FIG. 2 is a side view of at least one embodiment of the capturing device of the present invention.

Furthermore, the capturing device(s) 20 of at least one embodiment includes a first network component 26 structured to operatively communicate with one or more other devices, such as, for example, the receiving device(s) 30 as disclosed herein. The network component 26 of the capturing device 20 may include a wireless network interface card, device, and/or circuitry structured to dispose the capture device 20 in a communicative relation with the other devices of the present invention via the wireless network 40, wired connection, etc. For purposes of illustration, FIG. 2 shows the network component 26 at least partially disposed in an external relation to the body 21 of the capture device 20, such as via an antenna. However, in at least one embodiment, the network component 26 may be substantially or completely disposed within the confines of the body 21 so as to be substantially or completely concealed therein.

In at least one embodiment, the capturing device 20 further comprises at least one local electronic storage medium structured to electronically store the one or more digital photographic images 25 thereon. For instance, the local electronic storage medium of the capturing device 20 may include an internal storage device 27 such as an internal hard drive or other like mechanism intended to be disposed within or otherwise remain inside the body 21 of the capture device 20. In addition, the local electronic storage medium of the capturing device 20 may include a removable storage device 28 such as a removable memory card, Universal Serial Bus ("USB") drive, Firewire drive, flash drive, etc. Of course, in such an embodiment, the capture device 20 further includes a cooperatively disposed slot, interface, and/or circuitry structured to operatively dispose and control the removable storage device 28.

The receiving device 30 of the various embodiments of the present invention generally comprises any device structured and disposed to receive the digital photographic image(s) 25 in accordance with the various embodiments of the present invention. In particular, the receiving device(s) 30 of at least one embodiment may, but need not, comprise a device structured to include the capability of capturing digital photographic image(s), such as, for example, a camera, cellular telephone, PDA, etc. Accordingly, the receiving device(s) 30 may in at least one embodiment be structured to include the various capabilities of one or more capturing device(s) 20, as described herein, such as, for example, the capability of capturing one or more digital photographic images 25. However, as will be discussed below, the receiving device(s) 30 need not, in any manner, have such structure and may instead generally comprise a stand-alone device such as a key fob or other like mechanism.

In addition, the receiving device 30 of at least one embodiment of the present invention may include a display assembly (not illustrated) which is structured and disposed to display to a user thereof various data, images, etc. The display assembly may be virtually any size and may include virtually any display device, including but not limited to a liquid crystal display ("LCD").

Figure 3:
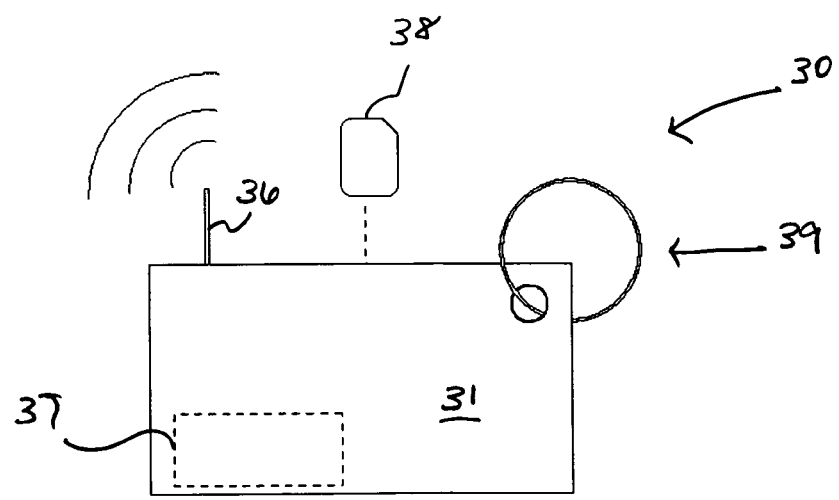
FIG. 3 is a front view of at least one embodiment of the receiving device of the present invention.

Referring now to FIG. 3, the receiving device 30 further comprises a second network component 36 similar in structure and function to the first network component 26 of the capturing device 20. For instance, the network component 36 of the receiving device 30 is structured to dispose the receiving device 30 in a communicative relation with one or more other devices, such as, for example the capturing device 20, via the one or more wireless networks 40, wired connection, etc. The network component 36 of at least one embodiment of the receiving device 30 includes a wireless network interface card and corresponding circuitry, and may further be substantially or completely externally or internally disposed relative to a body 31 of the receiving device 30.

In at least one embodiment of the present invention, the receiving device 30 further comprises at least one local electronic storage medium structured to electronically store various data and/or information, including, for example, the one or more digital photographic images 25. The local electronic storage medium of the receiving device 30 may include an internal storage device 37, such as an internal hard drive or other like mechanism structured and intended to remain disposed within the confines of the body 31 of the receiving device 30. The local electronic storage medium of the receiving device 30 may instead or additionally include a removable storage device 38, such as, for example, a removable storage card, Universal Serial Bus ("USB") device, Firewire device, flash drive, etc. In such an embodiment, the receiving device 30 further includes the corresponding slot, interface, and/or circuitry to operatively dispose and control the removable storage device 38.

Still referring to FIG. 3, the receiving device 30 may comprise an attachment assembly 39 structured to dispose the receiving device 30 in a removably attached relation to a user's key chain, belt loop, or other like location. However, as described above, in at least one embodiment, the receiving device 30 is similar in structure and function to capturing device 20 and thus may include a capturing assembly (not illustrated). Thus, in at least one embodiment, the receiving device(s) 30 may also function as a capturing device 20 as disclosed in the present specification. Similarly, as will be discussed below, the capturing device(s) 20 of the present invention may function as a receiving device 30.

As will become apparent from the following discussion, the digital photographic image(s) 25 of the various embodiments of the present invention comprises at least one visual component, which may include either still and/or moving images. In at least one embodiment, the digital photographic image(s) 25 may further include at least one data component. The data component(s) of the digital photographic image(s) 25 includes, for example, an image number, GPS and/or geographic location information (e.g., the latitude and longitude, or an estimate thereof, where the image 25 was captured), audio system information, date and time information (e.g., the date and time when the image 25 was captured), identification information of the user of the capturing device 20 (e.g., name, e-mail address, username, alias), identification of the capturing device 20, subject identification of the image 25, etc., or other information as disclosed and described in U.S. Patent Application No. 2006/0114338 to Leigh M. Rothschild, entitled "Device and Method for Embedding and Retrieving Information in Digital Images," having Ser. No. 11/051,069, filed on Feb. 4, 2005, which is incorporated herein in its entirety by reference. Accordingly, in at least one embodiment, the capturing device comprises a locational module, including, but not limited to a Global Positioning System ("GPS"), structured to encode the geographic location of the capturing device 20 during the capture of each digital photographic image 25. The present invention is structured to associate the one or more data components within the digital photographic image(s) 25 so as to facilitate the practice of the present invention in the intended manner, as described herein.

Further, the capturing device 20 of at least one embodiment is structured and disposed to automatically communicate the digital photographic image(s) 25 to the receiving device 30 upon the selective capture of the at least one digital photographic image(s) 25. Particularly, in at least one embodiment, the capturing device 20 and the receiving device 30 are disposed in a communicative relation with one another prior to the capturing of the digital photographic image(s) 25. Accordingly, upon the capturing of the image(s) 25, because the capturing device 20 and the receiving device 30 are disposed in the communicative relation with one another, the capturing device 20 of at least one embodiment is structured and configured to automatically communicate the image(s) 25 to the receiving device 30. Of course, the capturing device 20 may be structured and/or programmed in a manner to facilitate the selective communication of the image(s) 25 to the receiving device 30. For instance, a user at the capturing device 30 may be able to select or decide which images 25 are in fact communicated to the receiving device 30 via the communicative relation therebetween.

Similarly, the receiving device 30 may be structured to automatically and/or selectively receive the image(s) 25 communicated by the capturing device 20. As such, a user at the receiving device 30 may view the image(s) 25, the title of the image(s) 25, a thumbnail of the image(s) 25, or other data component of the image(s) 25 on a display assembly or other viewing screen. The user may then selectively receive the image(s) 25 by selectively accepting or rejecting them.

Figure 4:
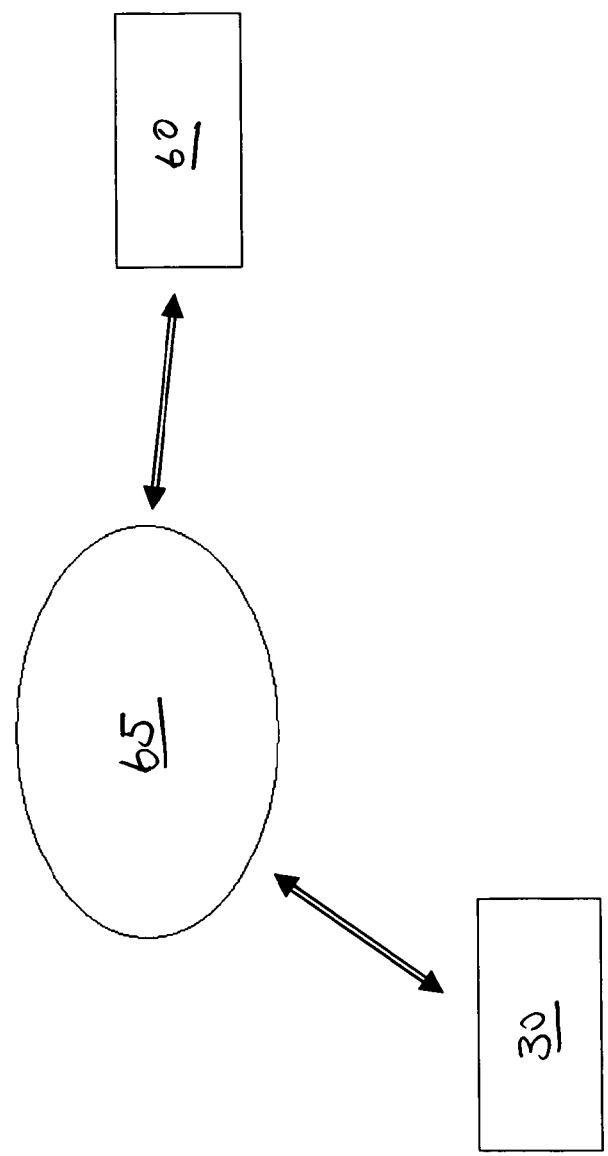
FIG. 4 is a schematic representation of the receiving device disposed in a communicative relation with a remote device disclosed in accordance with the present invention.

Once the digital photographic image(s) 25 is received by the receiving device 30, the image(s) 25 may be electronically stored on the local electronic storage medium, such as the internal storage device 37 and/or the removable storage device 38, as described above. In at least one embodiment, however, as illustrated in FIG. 4, the receiving device 30 is disposable in a communicative relation with at least one remote device 60 via one or more interactive computer networks 65. In particular, the receiving device 30 of the present invention is structured to either automatically and/or selectively communicate the digital photographic image(s) 25 to the remote device 60 via the interactive computer network 65. More in particular, the remote device 60 of at least one embodiment includes, for example, a web server having a remote electronic storage medium. Specifically, the remote device 60 and/or web server may be utilized in conjunction with and/or be controlled by one or more third-party image sharing services, including, but in no way limited to FLICKR®, SHUTTERFLY®, KODAK® EASYSHARE®, and SONY® IMAGESTATION®. Thus, the image(s) 25 may be uploaded to the remote device 60, web server(s) or third party services and be accessible by the public and/or authorized individuals. In addition, the remote device 60 may include a user's home computer, laptop computer, PDA, e-mail server, personal web page, etc. Further, the interactive computer network 65 and/or other communication protocol may be wireless and/or wired, and includes, for example, the World Wide Web, LAN, WAN, peer-to-peer ("P2P") network, direct connection, Bluetooth, PAN, cellular, etc.

In at least one embodiment, however, the capturing device 20 may be disposed in a communicative relation with the remote device 60, identified above. Accordingly, the capturing device 20 of at least one embodiment is structured to communicate the digital photographic image(s) 25 to the remote device 60 via the communicative relation therebetween instead of or in addition to communicating the digital photographic image 25 to the receiving device 30.

In yet another embodiment of the present invention, the capturing device(s) 20 and the receiving device(s) 30 are disposed in a selectively paired relationship with one another via at least one common pre-defined pairing criteria 50. For instance, the capturing device 20 and receiving device 30 include or are otherwise associated with various pairing criteria 50 including, for example, a device identification or ID, a device name, social and/or affinity groups, e-mail address associated with the device or user of the device, geographic location of the device, subject identification of the image 25, geographic location where the image 25 was captured, etc., each of which may be stored on the local electronic storage medium, for example. More in particular, the device ID includes a serial number, model name/number, or other identification unique to the particular device 20, 30. Moreover, the device name comprises a pre-defined username or other like identification unique to the user or owner of the particular device. Further, the social and/or affinity group comprises a list or identification of groups the owner or user belongs to. For instance, the social or affinity group(s) may be specified, updated, or designated on the device 20, 30 itself, for example, by utilizing a keyboard, touch pad, touch screen, voice recognition, or other input means located on or in a communicative relation with the device 20, 30. Of course, in at least one embodiment, the device(s) 20, 30 may be updated, synchronized, or modified via a wired and/or wireless connection with, for example, a laptop or desktop computer so as to specify, update, and/or synchronize with a social and/or affinity group as described herein. As such, a group of individuals or users may create or designate a group having a pre-determined or pre-specified name or ID. Each user may then identify the group on their device 20, 30 for purposes of disposing the particular device 20, 30 in a paired relationship with other devices 20, 30 belonging to users of the same group. Further, in at least one embodiment, the social and/or affinity group is capable of being synchronized with an interactive social network accessible via the World Wide Web, including, but certainly not limited to MYSPACE®, FACEBOOK®, FRIENDSTER®, LINKEDIN®, etc. In such an embodiment, the social/affinity group of the pre-defined pairing criteria 50 may be synchronized with the user's "friends" or "contacts" on the one or more interactive social networks accessible via the World Wide Web by connecting to networks wirelessly or via a cable.

In at least one embodiment, a capturing device 20 and a receiving device 30 disposed in a selectively paired relationship, as described above, are automatically or selectively disposed in a communicative relation with one another as the devices 20, 30 are disposed in a predetermined and/or proximate relation to one another or are otherwise disposed within the confines of the wireless network 40. As such, in at least one embodiment, the device 20, 30 are disposed in the pre-determined proximate relation when they are disposed in the same room, party, wedding, etc., or otherwise disposed in an operative relation to one another and being capable of communicating via the wireless network 40, which as above, may include short and/or long range communication technologies. For instance, the receiving device 30 of at least one embodiment is structured to alert or notify the user thereof that a capturing device 20 having one or more common pre-defined pairing criteria 50, or otherwise having a selectively paired relationship therewith, is capable of being disposed in a communicative relation. Of course, the capturing device 20 of at least one embodiment may be similarly structured in that it may alert a user thereof that a receiving device 30 having one or more common pre-defined pairing criteria 50 is capable of being disposed in a communicative relation therewith. In at least one embodiment, for two or more devices disposed in a paired relationship or otherwise being associated with one or more common pre-defined pairing criteria 50, the communicative relation is automatically created, however, the user at the capturing and/or receiving device 20, 30, respectively, may, of course, accept and/or reject the communicative relation therewith. Once disposed in the communicative relation with one another, the capturing device 20 is structured to communicate one or more digital photographic images 25 to the receiving device 30, in the manner as described above.

In yet another embodiment of the present invention, the capturing device 20 and receiving device 30 may be disposed in a selectively paired and/or communicative relation with one another by virtue of disposing one of the devices 20, 30 in an "available" mode thereby broadcasting its presence to other devices 20, 30 disposed in a predetermined and/or proximate relation thereto, as discussed above. Once a device 20, 30 is disposed in the "available" or broadcasting mode, the other device(s) 20, 30 may accept or pair with the device. The devices 20, 30 may, in at least one embodiment, need to share a passkey or other authorization code prior to disposition of the devices 20, 30 in the paired or communicative relation with one another. Furthermore, the device 20, 30 may also include a "touch-to-pair" feature which is structured to dispose the devices 20, 30 in a paired and/or communicative relation with one another by bringing the two devices 20, 30 in a close proximity, such as within ten (10) centimeters, with one another.

Figure 5:
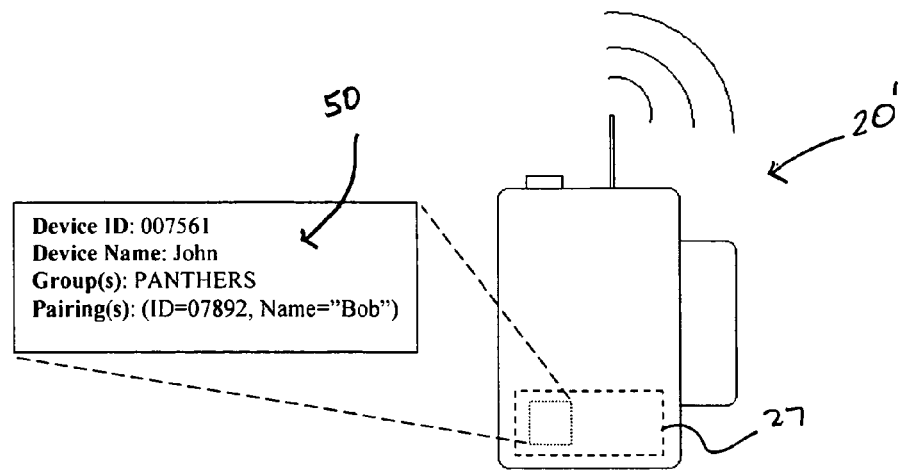
FIG. 5 is a schematic representation of at least one embodiment of the pairing criteria of the present invention.
Figure 6:
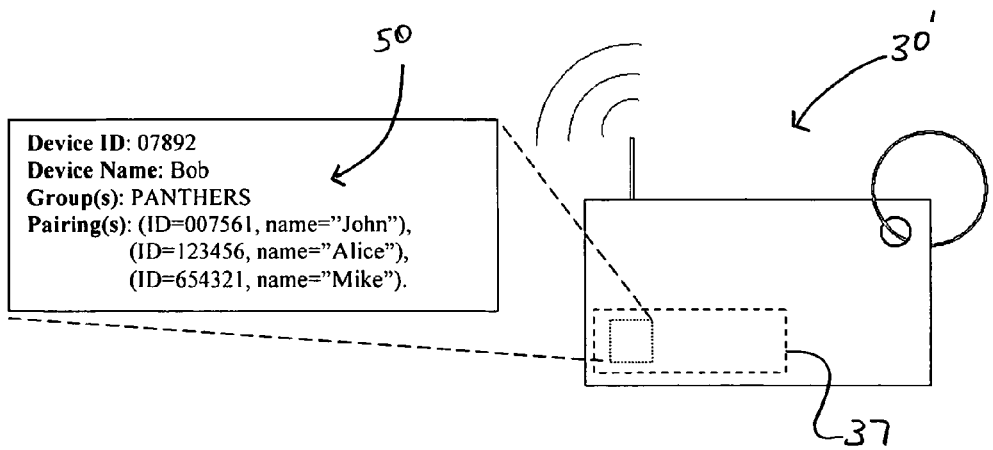
FIG. 6 is a schematic representation of at yet another embodiment of the pairing criteria of the present invention.
Figure 7:
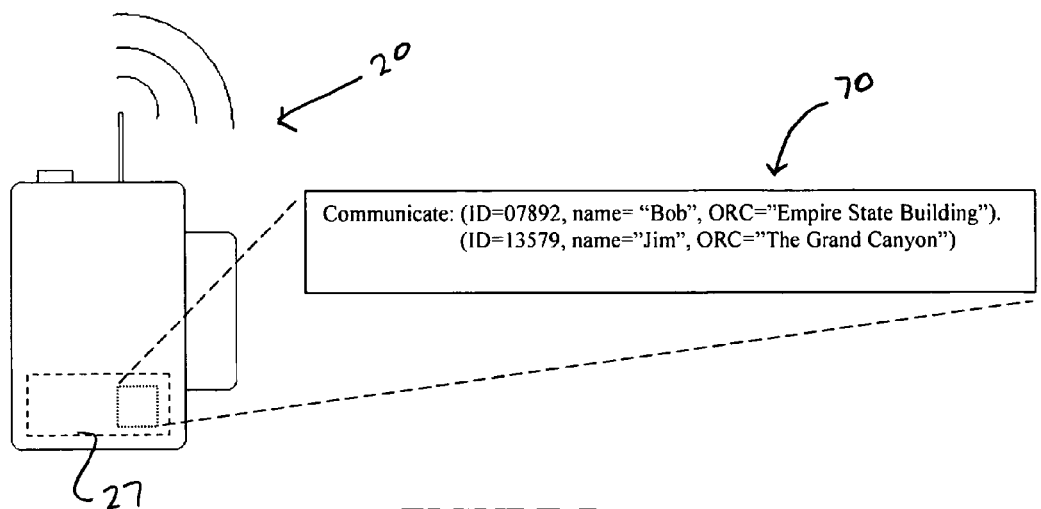
FIG. 7 is a schematic representation of at least one embodiment of the transfer criteria of the present invention.
Figure 8:
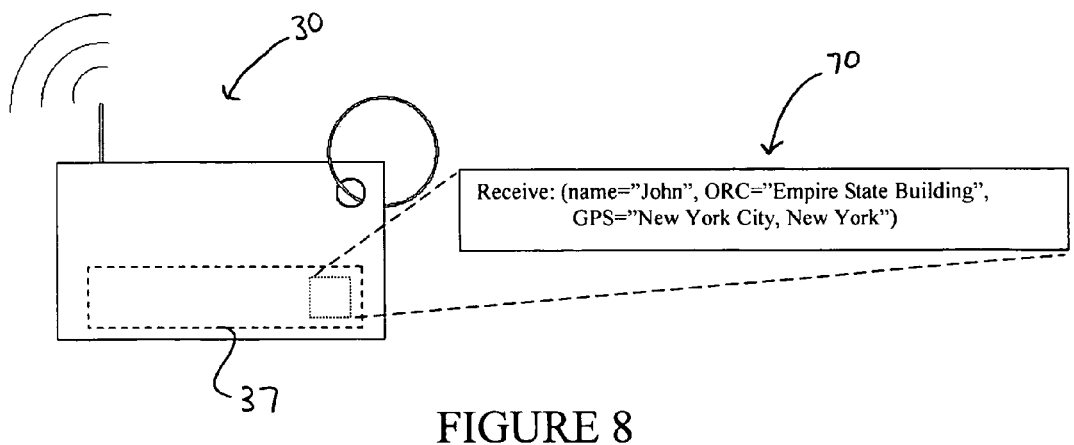
FIG. 8 is a schematic representation of yet another embodiment of the transfer criteria of the present invention.

For exemplary purposes only, the capturing device 20' and receiving device 30' illustrated in FIGS. 5 and 6, respectively, include or are otherwise associated with at least one common pre-defined pairing criteria 50, and are thus otherwise disposed in a selective pairing relationship with one another. For instance, as shown in FIGS. 5 and 6, the pairing criteria 50 of the capturing device 20' comprises "Bob, 07892" which corresponds to the device name and device ID of the receiving device 30'. Similarly, the pairing criteria 50 of the receiving device 30' comprises "John, 007561", which corresponds to the device name and device ID of the capturing device 20'. Accordingly, in at least one embodiment, as the capturing device 20' and the receiving device 30' are disposed in a predetermined or proximate relation to one another or otherwise within a wireless network 40, the devices 20', 30' may be automatically or selectively disposed in a communicative relation with one another, and thus the capturing device 20' is structured to communicate one or more digital photographic images 25 to the receiving device 30' in accordance with the present invention. For instance, if the capturing device 20' captures an image 25 while disposed in a communicative relation with the receiving device 30', the image 25 may be automatically or selectively communicated to the receiving device 30' which may automatically or selectively receive the image 25.

Moreover, in at least one embodiment, in the event the devices 20, 30 are disposed out of the communicative relation, for example, in the event the receiving device 30 travels out of range of the wireless network 40, the capturing device 20 may save, record, or otherwise track the one or more digital photographic images 25 which were captured during the lost communication with the receiving device 30. Once the capturing device 20 and the receiving device 30 are disposed in the communicative relation with one another, the capturing device 20 is structured to communicate the stored or queued images to the receiving device 30, similar to communication of the individual images 25 as described above.

In yet another embodiment of the present invention, the pre-defined pairing criteria 50 includes an object recognition and/or subject identification component which is structured to define the subject matter, topic, or theme of the digital photographic image 25. For instance, the capturing device 20 may include object recognition software or other mechanism(s) for identifying objects or individuals located within a captured image 25. In addition, a user at the capturing device 20 may manually tag or embed the image(s) 25 with data corresponding to the subject matter, theme, or topic thereof. For exemplary purposes only, an image 25 of the Empire State Building may be embedded or tagged with data which identifies the Empire State Building within that particular image 25. Of course, in at least one embodiment, the user of the capturing device 20 may simply re-name the title of the image 25 to include a title or name corresponding to the Empire State Building, and thus, in at least one embodiment, the subject identification component comprises the title and/or file name of the digital photographic image 25.

Either way, receiving device 30 of at least one embodiment, may be structured to search or scan for one or more capturing devices 20 within a certain area which includes one or more images 25 having a particular object recognition component. For instance, a receiving device 30 may be configured to be disposed in a selectively paired relationship with capturing device(s) 20 having one or more images 25 of the Empire State Building. Similarly, a capturing device 20 may be structured and configured to be disposed in a paired relationship with receiving device(s) 30 searching for a particular type of image, or otherwise having a pre-defined pairing criteria 50 including a particular object recognition component.

In a further embodiment of the present invention, the capturing device 20 is structured to filter the digital photographic image(s) 25 which are communicated to the receiving device 30. For instance, the capturing device 20 may comprise or otherwise be associated with one or more pre-defined transfer criteria 70. Thus, prior to the communication of the digital photograph image(s) 25 from the capturing device 20 to the receiving device 30, the image(s) 25 is compared to the transfer criteria 70. If the image(s) 25 conforms to the transfer criteria 70, and/or if one or more data components of the image(s) 25 includes the transfer criteria 70, then the image(s) 25 is communicated to the receiving device 30 in the manner discussed above.

In particular, the transfer criteria 70 of at least one embodiments includes, but is certainly not limited to, title of the image(s) 25, subject matter of the image(s) 25, and/or any of the other data component(s) of the digital photographic image(s) 25, as discussed above, which include, for example, locational or Global Positioning System ("GPS") information, audio system information, date and time information, user identity information. For instance, once disposed in the communicative relation with one another, instead of having all digital photographic images 25 communicated from the capturing device 20 to the receiving device 30, the at least one pre-defined transfer criteria 70 is structured to filter the image(s) 25 and determine which, if any, are in fact communicated.

For exemplary purposes only, utilizing the pre-defined pairing criteria 50 and/or the transfer criteria 70, the capturing device 20 of at least one embodiment may be structured and configured to communicate certain image(s) 25 to certain receiving devices 30. For instance, the capturing device 20 may be structured, configured, and/or programmed to communicate images 25 of the Empire State Building to a receiving device 30 having a device name "Bob," and communicate images 25 of the Grand Canyon to a receiving device having a device name "Jim." As above, the subject of the image 25 may be identified by object recognition software, one or more modified data components of the image(s) 25, and/or the title of the image 25.

In addition, the receiving device 30 of at least one embodiment is structured to filter the digital photographic images 25 received by the capturing device 20. For instance, similar to the capturing device 20 just described, the receiving device 30 of at least one embodiment comprises or is otherwise associated with one or more transfer criteria 70. Thus, prior to receipt of the digital photograph image(s) 25 from the capturing device 20, the image(s) 25 is compared to the transfer criteria 70. If the image(s) 25 conforms to the transfer criteria 70, and/or if one or more data components of the image(s) 25 includes the transfer criteria 70, then the image(s) 25 is communicated to the receiving device 30 in the manner discussed above.

For exemplary purposes only, utilizing the pairing criteria 50 and/or the transfer criteria 70, the receiving device 30 may be structured and configured to only receive and/or accept certain images 25, such as, for example, images 25 entitled "Empire State Building" that were captured at a particular latitude and longitude, address, or city, and have been captured from a particular capturing device 20, namely one having a particular device name and being disposed a particular distance from the receiving device 30.

In yet another embodiment of the present invention, the capturing and/or receiving device 20, 30 includes an object alerting module structured to minimize or eliminate duplicative image(s) 25 captured by a capturing device 20 and receiving device 30, wherein the devices 20, 30 are disposed in a communicative and/or paired relationship with one another. For instance, as discussed above, the receiving device 30 of at least one embodiment includes a capture assembly or other mechanism(s) structured to capture one or more digital photographic images 25. In addition, the receiving device 20 may thus utilize object recognition software or other like feature(s) structured to identify the object, theme, subject matter, or topic of an image which is about to be captured or has been captured by the receiving device 30. Accordingly, in at least one embodiment, a user at the receiving device 30 may be notified or alerted when an object or subject which the receiving device 30 is about to capture or has been captured, is already the subject of an image 25 captured by one or more capturing devices 20. In such an embodiment, the user at the receiving device 30 need not duplicate the image(s) 25 which has already been obtained by the capturing device 20. Of course, in at least one embodiment, the capturing device 20 may be alerted in a similar manner in the event a receiving device 30 disposed in a communicative or paired relation therewith has already captured an image having the same or similar subject, object, theme, or topic as one about to be or already captured by the capturing device 20.

Figure 9:
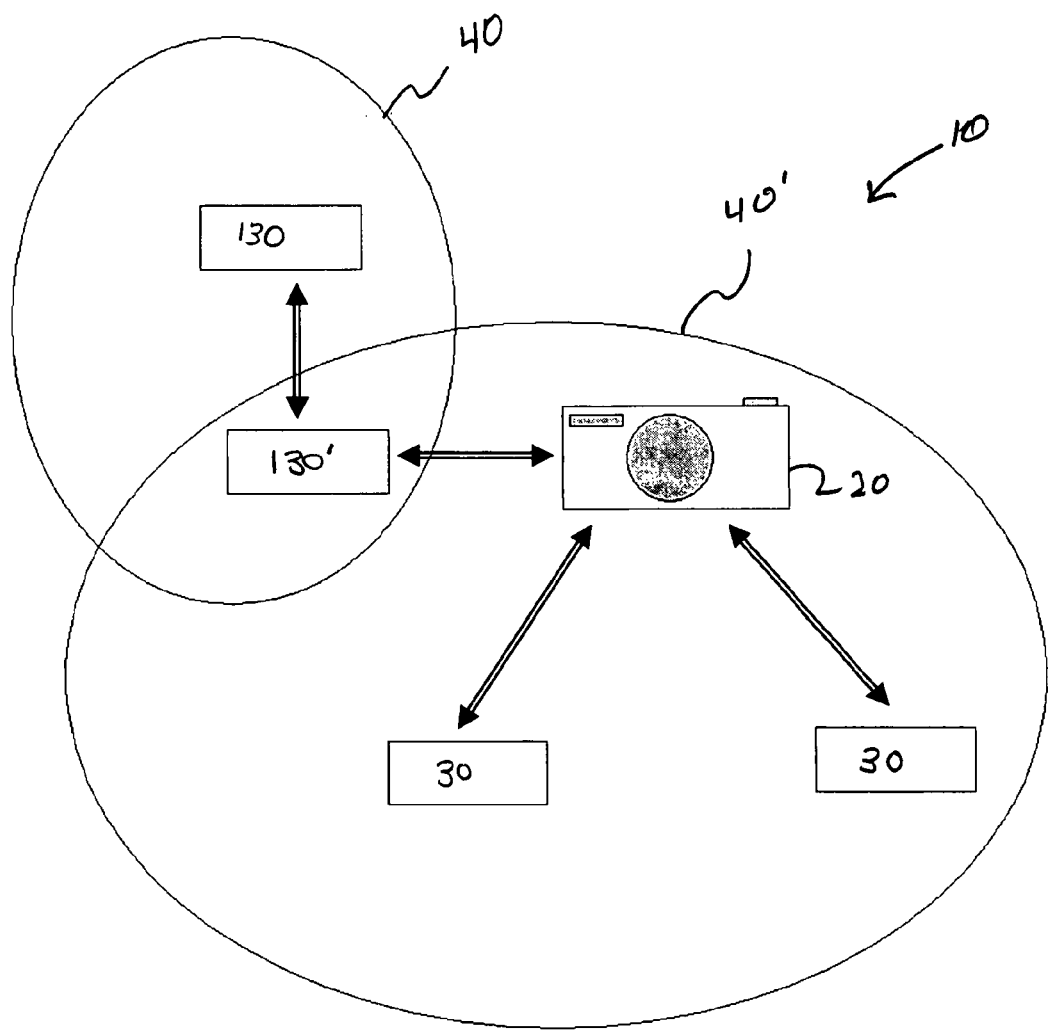
FIG. 9 is a schematic representation of yet another embodiment of the system disclosed in accordance with the present invention.
Figure 10:
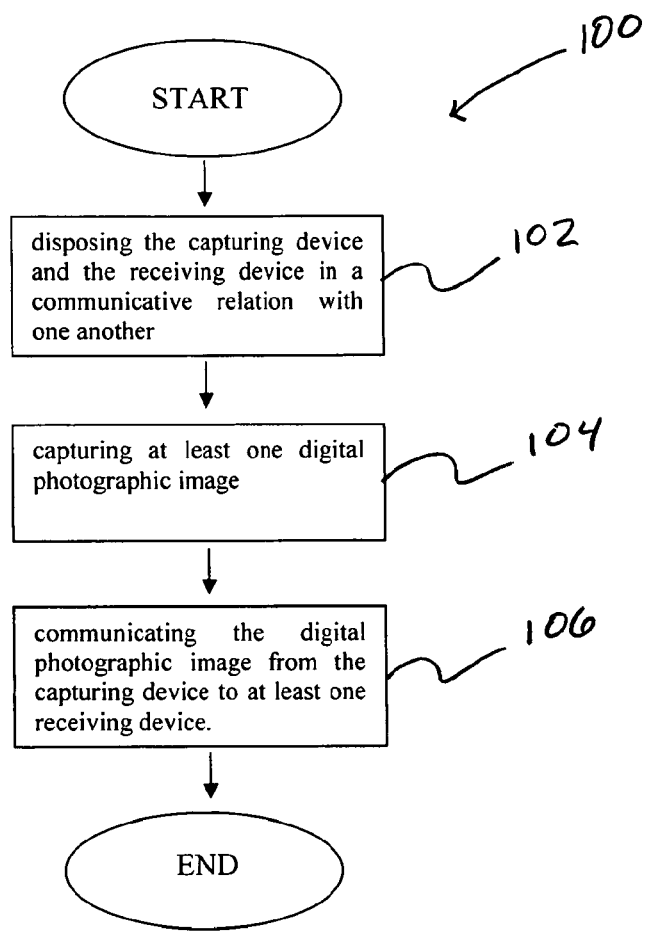
FIG. 10 is a flow chart illustrating at least one embodiment of the method disclosed in accordance with the present invention.
Figure 11:
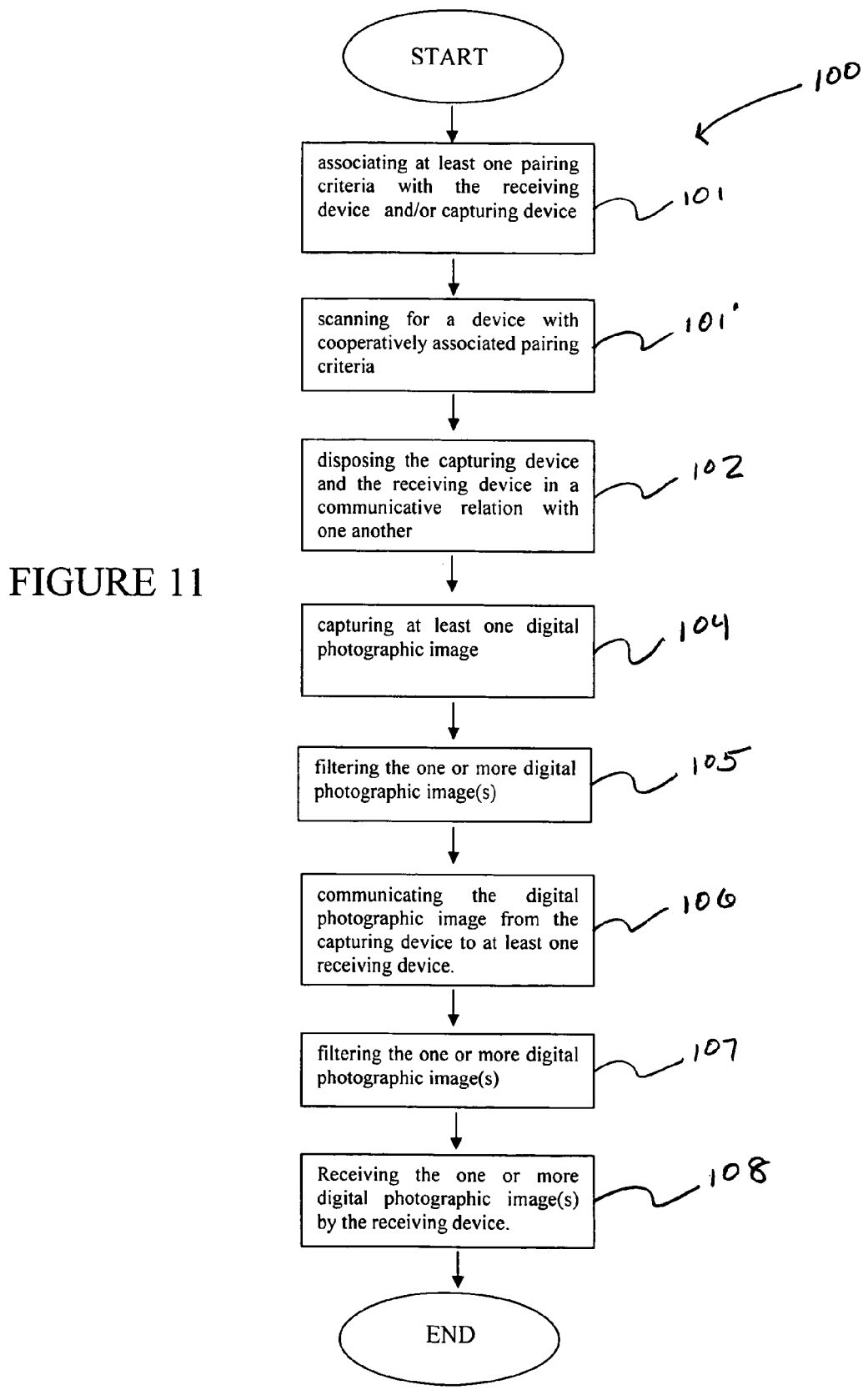
FIG. 11 is a flow chart illustrating at least one other embodiment of the method of the present invention.

Referring now to FIG. 9, yet another embodiment of the present invention further comprises a first receiving device 130 disposed in a communicative relation with the capturing device 20 via an interconnecting chain of a plurality of wireless networks 40, 40'. Particularly, a second and/or relay receiving device 130' is disposed in a communicative relation with the first receiving device via a first wireless network 40. Further, the second receiving device 130' is disposed in a communicative relation with the capturing device 20 via a second wireless network 40'. As with at least one of the embodiments discussed above, the wireless networks 40, 40' may include short range technology, such as Bluetooth, however, use of the World Wide Web is also contemplated. As such, communication of a digital photographic image 25 from the capturing device 20 to the first receiving device 130 is implemented via the interconnecting chain of wireless networks 40, 40'. In such an embodiment, the image(s) 25 may or may not be communicated to the second or relay receiving device 130'.

The present invention further comprises a method for distributing at least one digital photographic image, generally indicated as 100. For instance, the method 100 comprises disposing at least one capturing device and at least one receiving device in a communicative relation with one another, as described in detail above, and as generally indicated as 102. The communicative relation between the capturing device and the receiving device may be via a short range communication technology, for example, Bluetooth, peer-to-peer, or other personal area network. However, the use of a WAN, LAN, cellular, satellite, or World Wide Web is also contemplated.

Moreover, the various embodiments of the method 100 further comprises capturing the at least one digital photographic image via the at least one capturing device, as indicated at 104, and communicating the at least one digital photographic image from the capturing device to the receiving device, as at 106. The digital photographic image of the present invention may be captured before or after disposing the capturing device and the receiving device in a communicative relation with one another.

Furthermore, the digital photographic image of the present invention may be automatically and/or selectively communicated from the capturing device to the receiving device, as discussed above. For exemplary purposes only, in at least one embodiment, once the capturing device and the receiving device are disposed in the communicative relation with one another, the devices may be configured to automatically communicate any digital photographic images captured by the capturing device to the receiving device, upon capturing the image, or otherwise as the images are captured by the capturing device. Of course, as indicated above, however, the method further includes selectively communicating the image(s) from the capturing device to the receiving device. In such an instance, a user at the capturing device may select which images to communicate to a particular receiving device.

In addition, at least one embodiment of the method 100 includes associating at least one pairing criteria with the receiving device and/or capturing device, indicated as 101, prior to disposition of the capturing device and the receiving device in the communicative relation with one another. In particular, as discussed above, the pairing criteria may include, for example, a device ID, device name, location of a device, object recognition component, etc. The pairing criteria may be associated with the capturing device and/or receiving device in a number of different manners. For instance, the device ID may be associated with the particular device by the manufacturer, creator, etc. of the device prior to the user being in possession of it. Of course, the user may associate a different or customized device ID, device name, group identification, specific pairings, other device IDs or device names, or any other pairing criteria via any input means such as a keyboard, virtual touchpad, voice recognition, etc. The pairing criteria may then be stored on an electronic storage medium, as discussed above, such as, for example, a local hard drive or removable memory card. In addition, the pairing criteria may be automatically associated with the particular device and stored on the electronic storage medium, without the user's input or active contribution. For instance, as discussed above, one device may be configured in an "available" or "visible" mode such that another device may be disposed in the paired relation therewith. Upon such pairing or disposition of the devices in a communicative relation with one another, in at least one embodiment, the pairing criteria is automatically associated with or stored on each of the devices for future pairing.

If the capturing device and the receiving device comprise cooperatively associated pairing criteria, then the capturing device and the receiving device are disposed in the communicative relation, as discussed above. Specifically, and for exemplary purposes only, if the receiving device is configured or otherwise associated with pairing criteria which identifies a device name "John" and a device ID as "007561", and the capturing device include a device name "John" and a device ID "007561", then the capturing device and the receiving device are disposed in a selectively paired relationship. In at least one embodiment, the method 100 further includes scanning for a device with cooperatively associated pairing criteria 101', and, in at least one embodiment, once the capturing and receiving devices are disposed in a proximate relation with one another, they are either automatically or selectively disposed in a communicative relation with one another, as at 102.

In a further embodiment, the method 100 of the present invention further includes associating at least one pairing criteria with the capturing device in a similar manner as associating the pairing criteria with the receiving device. In particular, if the capturing device and receiving device comprise cooperatively associated pairing criteria, then they are disposed in a communicative and/or paired relationship with one another.

In addition and as also discussed above, at least one embodiment of the method 100 includes filtering the digital photographic images, for example, via one or more transfer criteria, as indicated at 105 and 107. In particular, the transfer criteria may be associated with the capturing device and/or receiving device, and may be defined prior to communication of the image(s) to the receiving device. For instance, the transfer criteria may be associated with the capturing and/or receiving devices in a similar manner as the pairing criteria is associated therewith. Specifically, the transfer criteria may be associated with the particular device via direct input by the user or other individual utilizing, for example, a keyboard, virtual keypad, voice recognition, or other input means. Similarly, the transfer criteria, in at least one embodiment, may be automatically associated with the particular device and/or associated with the device by the manufacturer, for example. As such, the transfer criteria may be disposed or stored on an electronic storage medium, for example, in a database or other similar storage means.

Further, the method 100 includes comparing the digital photographic image(s) and/or the data component(s) thereof with the one or more transfer criteria. If the image(s) is corresponding associated with the transfer criteria, then the image is communicated to (as at 106) and/or received by (as at 108) the receiving device. As above, the transfer criteria may include, for example, the subject, object, theme, or topic of the image, as well as a location, date, time, or other image data component.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. An image-capturing mobile device, comprising
a wireless receiver;
a wireless transmitter; and
a processor operably connected to the wireless receiver and the wireless transmitter, wherein the processor is configured to initiate and/or perform
receiving a plurality of photographic images;
filtering the plurality of photographic images using a transfer criteria; and
transmitting, via the wireless transmitter and to a second mobile device, the filtered plurality of photographic images, wherein
the transfer criteria is a geographic location of the image-capturing mobile device.

2. The image-capturing mobile device of claim 1, wherein
the image-capturing mobile device and the second mobile device are disposed in a selectively paired relationship with one another based upon the geographic location.

3. The image-capturing mobile device of claim 1, wherein
the transfer criteria is a subject identification of a respective photographic image within the plurality of photographic images.

4. The image-capturing mobile device of claim 3, wherein
the image-capturing mobile device and the second mobile capturing device are disposed in a selectively paired relationship with one another based upon the subject identification.

5. An image-capturing mobile device, comprising
a wireless receiver;
a wireless transmitter; and
a processor operably connected to the wireless receiver and the wireless transmitter, wherein the processor is configured to initiate and/or perform
receiving a plurality of photographic images;
filtering the plurality of photographic images using a transfer criteria; and
transmitting, via the wireless transmitter and to a second mobile device, the filtered plurality of photographic images, wherein
the transfer criteria is a geographic location associated with a respective photographic image within the plurality of photographic images.

6. An image-capturing mobile device, comprising
a wireless receiver;
a wireless transmitter; and
a processor operably connected to the wireless receiver and the wireless transmitter, wherein the processor is configured to initiate and/or perform
receiving a plurality of photographic images;
filtering the plurality of photographic images using a transfer criteria;
transmitting, via the wireless transmitter and to a second mobile device, the filtered plurality of photographic images; and
receiving, via the wireless receiver and from the second mobile device, the transfer criteria.

7. The image-capturing mobile device of claim 6, wherein
the transmitting is conditional upon the image-capturing mobile device and the second mobile device meeting a pre-defined pairing criteria.

8. An image-capturing mobile device, comprising
a wireless receiver;
a wireless transmitter; and
a processor operably connected to the wireless receiver and the wireless transmitter, wherein the processor is configured to initiate and/or perform
receiving a plurality of photographic images;
filtering the plurality of photographic images using a transfer criteria; and
transmitting, via the wireless transmitter and to a second mobile device, the filtered plurality of photographic images, wherein
the image-capturing mobile device and the second mobile device are disposed in a selectively paired relationship with one another based upon an affinity group associated with the second mobile device.

9. A method preformed by an image-capturing mobile device, comprising
receiving a plurality of photographic images;
filtering the plurality of photographic images using a transfer criteria; and
transmitting, via a wireless transmitter and to a second image capturing device, the filtered plurality of photographic images, wherein
the transfer criteria is a geographic location of the image-capturing mobile device.

10. The method of claim 9, wherein
the image-capturing mobile device and the second mobile device are disposed in a selectively paired relationship with one another based upon the geographic location.

11. The method of claim 9, wherein
the transfer criteria is a subject identification of a respective photographic image within the plurality of photographic images.

12. The method of claim 11, wherein
the image-capturing mobile device and the second mobile capturing device are disposed in a selectively paired relationship with one another based upon the subject identification.

13. A method performed by an image-capturing mobile device, comprising
receiving a plurality of photographic images;
filtering the plurality of photographic images using a transfer criteria; and
transmitting, via a wireless transmitter and to a second image capturing device, the filtered plurality of photographic images, wherein
the transfer criteria is a geographic location associated with a respective photographic image with the plurality of photographic images.

14. The method of claim 13, wherein the processor is further configured to initiate and/or perform
receiving, via the wireless receiver and from the second mobile device, the transfer criteria.

15. The method of claim 13, wherein
the transmitting is conditional upon the image-capturing mobile device and the second mobile device meeting a pre-defined pairing criteria.

16. A method performed by an image-capturing mobile device, comprising
receiving a plurality of photographic images;
filtering the plurality of photographic images using a transfer criteria; and
transmitting, via a wireless transmitter and to a second image capturing device, the filtered plurality of photographic images, wherein
the image-capturing mobile device and the second mobile device are disposed in a selectively paired relationship with one another based upon an affinity group associated with the second mobile device.

* * * * *